INVENTOR.
RAYMOND C. WOODBURY

Nov. 17, 1970

JAMES E. WEBB
ADMINISTRATOR OF THE NATIONAL AERONAUTICS
AND SPACE ADMINISTRATION
NOISE LIMITER 3,541,459

Filed Jan. 30, 1968

INVENTOR.
RAYMOND C. WOODBURY
BY
ATTORNEYS

United States Patent Office 3,541,459
Patented Nov. 17, 1970

3,541,459
NOISE LIMITER
James E. Webb, Administrator of the National Aeronautics and Space Administration, with respect to an invention of Raymond C. Woodbury, La Canada, Calif.
Filed Jan. 30, 1968, Ser. No. 701,733
Int. Cl. H03k 5/08
U.S. Cl. 328—171  6 Claims

ABSTRACT OF THE DISCLOSURE

A circuit for limiting the peak excursions of random noise inputs to a level proportional to the average input. The circuit comprises a pair of diodes for clipping the positive and negative peaks of an input signal, and a capacitor charged by the input signal for back-biasing the diodes to a value proportional to the average input signal. The capacitor voltage is applied to the diodes through operational amplifiers, to provide a low impedance path for currents passing through the diodes.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF INVENTION

This invention relates to circuits for amplitude limiting of signal peaks.

Random noise signals are used in a variety of applications for testing equipment. Such signals may contain occasional peaks of very high amplitude which can damage the equipment. For example, some equipment is tested by vibration machinery excited with random noise signals for simulating the numerous shocks to be encountered during the life of the equipment. However, such equipment may be designed to withstand only a maximum amplitude of shock, and it is necessary to limit the peak excursions of the noise signal inputs. The peak amplitude of the noise signals can be limited by clipping them at a fixed level. However, it is often necessary to vary the average amplitude of the noise signals, as for example to enable the vibration testing of equipment of different masses on the same vibration machinery. Peak clipping at a fixed level would prevent sufficient variations in the average amplitude of the noise signals. Thus, it is necessary to provide means for limiting the peak amplitude of the noise signal inputs in proportion to an average value of the signals, for signals whose average value may be varied.

OBJECTS AND SUMMARY OF THE INVENTION

Accordingly, one object of the present invention is to provide a circuit for limiting the peak amplitude of signal inputs thereto in accordance with the average value of the signal inputs.

Another object of the invention is to provide a circuit for clipping signal inputs thereto which exceed a predetermined percentage of the average input thereto, and which provides an indication of the amount of clipping performed by the circuit.

Yet another object of the invention is to provide a circuit for limiting the amplitude of signal inputs thereto, which indicates the peak amplitude of input signals which have been clipped.

In accordance with the present invention, there is provided a circuit for limiting input signal excursions to a predetermined percentage (e.g., several hundred percent) of the average input signal value during an immediately preceding period. The circuit input is coupled to the circuit output through two diodes. The two diodes respectively clip positive and negative excursions exceeding a predetermined value. The diodes are biased by a voltage level bearing a predetermined relationship to the average amplitude of the signal input to the circuit.

In one embodiment of the invention, the average signal input value during a period is established by a capacitor connected to the circuit input. The voltage across the capacitor is used to bias one of the diodes, and, after passage through an inverter, this voltage is used to bias the other diode. The resistance in the diode biasing means is maintained at a very low level by utilizing an operational amplifier between the capacitor and the diodes.

The circuit also includes means for providing an indication of the occurrence of peak clipping of the input signals, and an indication of the peak level of the signals being clipped. This is accomplished by sensing the voltage across a resistor connected between the diodes and the input. The voltage across this resistor increases suddenly when one of the diodes conducts to clip the signal, inasmuch as large currents then flow through this resistance to the diode. The voltage across the resistance is delivered to the input of an oscilloscope for providing a visual indication. The oscilloscope displays pulses having a height proportional to the amount of voltage clipped.

A better understanding of the invention may be had by considering the following specification and claims, when taken in conjunction with the accompanying drawings.

DESCRIPTION OF THE PREFERRED EMBODIMENTS

Figure 1:
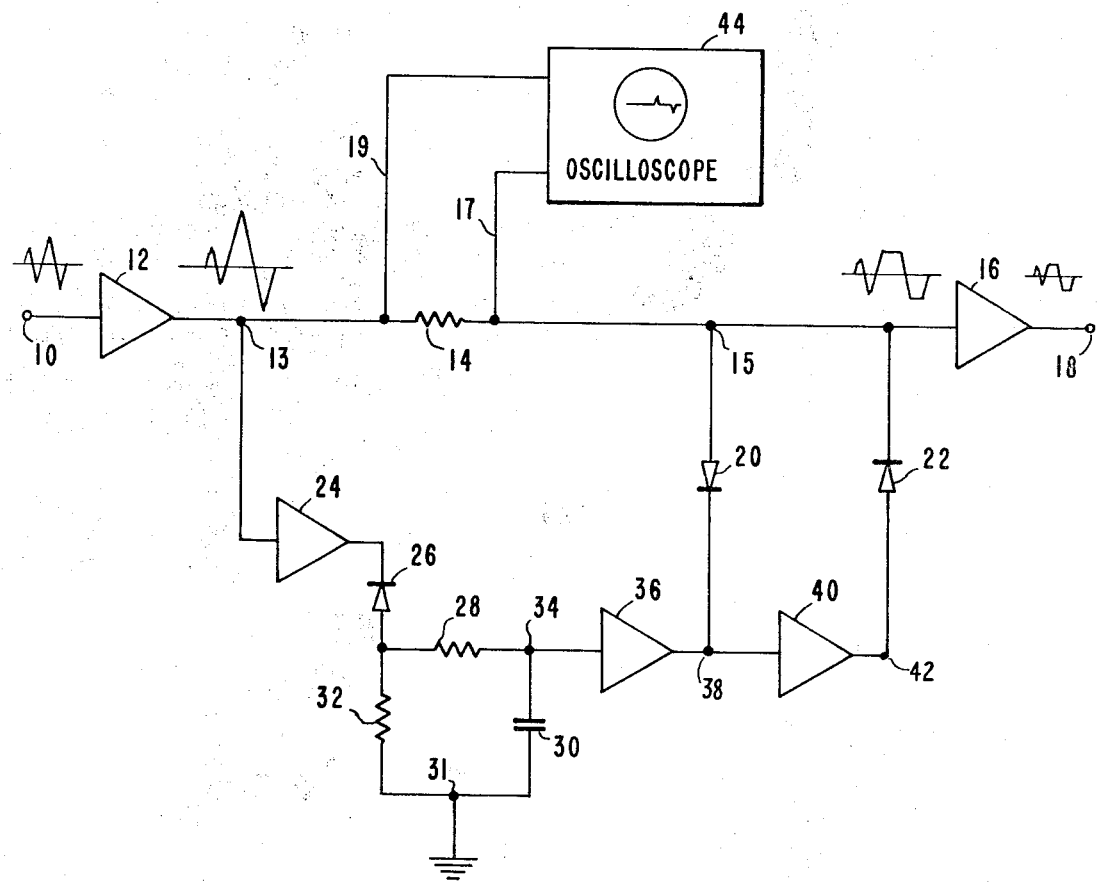
FIG. 1 is a simplified schematic diagram of one embodiment of the invention.

FIG. 1 is a simplified schematic diagram of a noise limiter comprising an input 10 which is usually supplied with gaussian random noise signals. The noise limiter circuit also includes an output 18 and a resistor 14 for coupling the input and output. An averaging means, comprising the circuitry connected between junction 13 and point 42 through amplifier 24, generates signals at 38 and 42 proportional to an average of the signals at the input 10. A pair of diodes 20 and 22 connected between resistor 14 and the points 38 and 42 of the averaging means, serves as a clipping means to limit the peak voltage output of the circuit. An oscilloscope 44 having inputs connected across the resistor 14, displays the voltage thereacross, which is appreciable only when one of the diodes 20 or 22 conducts to clip the signals.

Referring now to the details of FIG. 1, the circuit includes a first amplifier 12, which amplifies the input signals received at input 10. The amplified signals pass through the resistor 14 to a second amplifier 16 which isolates its input from its output 18. The output 18 delivers signals identical in form to those received at the input 10, except that all peaks at the input 10 which are greater than a predetermined proportion of the average of the signal inputs are clipped.

In the clipping of the peak signals by the diodes 20 and 22, diode 20 clips the positive excursions and diode 22 clips the negative excursions. This is accomplished by back-biasing each of the diodes to the voltage level at which limiting is to occur. The voltage values at which clipping is to occur is established by a circuit portion comprising a third amplifier 24 which amplifies the signal output of the first amplifier 12. A diode 26 passes the negative portion of all voltages received from the third amplifier 24 to a resistor 28 and capacitor 30 for establishing an average of the voltage inputs. Part of the current which passes through diode 26 passes through capacitor 30 to charge it, while resistor 32 provides a path for constantly discharging the capacitor 30. The ground terminal 31 serves as a reference voltage to which the clipping voltages are referenced.

The charge across the capacitor 30 has a value proportional to the average of negative excursions of the noise inputs at 10 to the entire circuit. The values of the resistances 28 and 32 determine how rapidly the capacitor responds to changes in the average value. The voltage across the capacitor 30 is sampled at a junction 34 which leads to the input of a fourth amplifier 36. The output 38 of the fourth amplifier 36 is a positive signal proportional to the voltage at 34. This positive signal output at 38 back-biases diode 20 so that diode 20 conducts only when the voltage at junction 15 is more positive than the voltage at the output 38. The voltage at the output 38 is delivered to a fifth amplifier 40 which inverts this voltage and applies it at its output 42 to one side of the diode 22 opposite the junction 15. The voltage at 42 is negative and prevents passage of currents through the diode 22 until the voltage at 15 is more negative than a predetermined negative value. This predetermined value is the negative of the positive clipping value for diode 20 in the case of an amplifier 40 of negative unity amplification.

When either of the diodes 20 or 22 conducts to clip the voltage, a relatively large current flows through resistor 14, while at other times little current flows through resistor 14 because amplifier 16 has a high input impedance. When a positive or negative voltage is clipped, the currents flowing through resistor 14 result in a voltage across that resistor. An oscilloscope 44 has input terminals 17 and 19 connected across the resistor 14. A screen of the oscilloscope 44 provides an indication of the occurrence of clipping, and provides wave forms showing the relative height of the signal portions being clipped.

Figure 2:
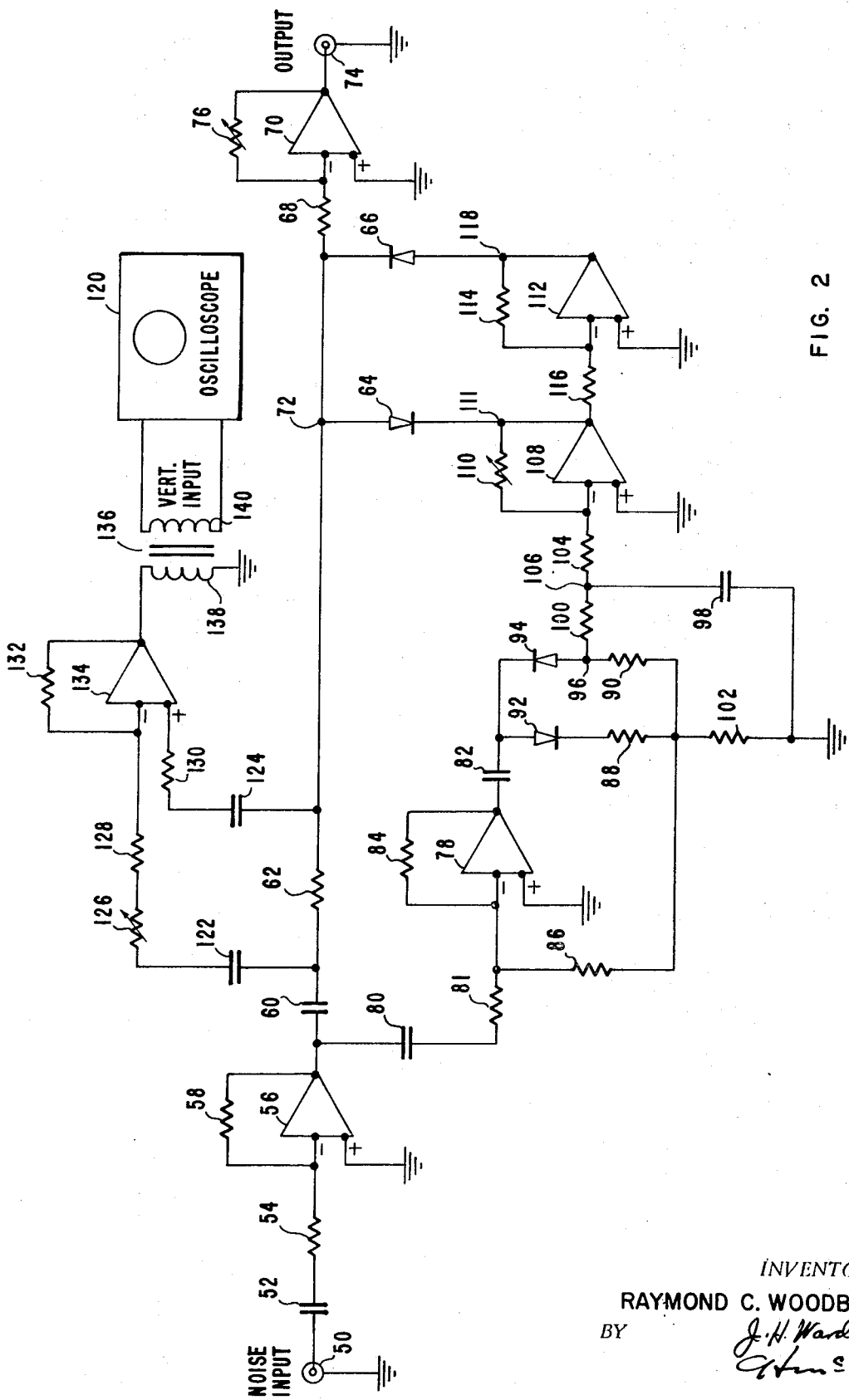
FIG. 2 is a more detailed schematic diagram of the invention which is shown in simplified form in FIG. 1.

FIG. 2 is a more detailed circuit diagram of a gaussian noise limiter of the type shown in FIG. 1. The circiut comprises an input 50 for receiving gaussian noise signals, a capacitor 52 and resistor 54 for passing the signals, and a preamplifier 56 for amplifying the input signals in accordance with the ratio of its feedback resistance 58 to the resistance 54. The output of the preamplifier 56 is applied to a series network comprising a capacitor 60 and resistor 62. This network is terminated by a load comprising diodes 64 and 66 and a resistor 68. Another amplifier 70 serves to isolate the junction 72 of the diodes 64 and 66 and the resistance 68 from the output 74 of the circuit. This amplifier 70 provides a gain proportional to the ratio between the resistance of its feedback resistor 76 and that of the resistors 68 and 62. Input signals which are not clipped pass from the input 50 through amplifier 56, past junction 72 to amplifier 70 and out of the circuit at output 74.

The output of amplifier 56 is also applied to an operational amplifier and rectifier circuit comprising operational amplifier 78, capacitors 80 and 82, resistors 81, 84, 86, 88, 102 and 90, and diodes 92 and 94. The additional diode 92 is provided to increase the linearity of the amplifier-feedback loop. The rectifier circuit provides voltages at junction 96 which represent the negative portions of the signal inputs at the input 50 to the circuit.

An averaging circuit including capacitor 98 and resistors 100 and 104 provides a negative voltage at junction 106 which is proportional to the average value of the negative excursions of inputs at 50. For a given type of signal such as a gaussian noise signal, this negative average value can be held close to a predetermined proportion or multiple of the root mean square input at 50.

An operational amplifier amplifies the voltage at junction 106 and applies it to the cathode side of diode 64. The operational amplifier 108 serves to isolate the RC network 100 and 98 from the variable load of the diode 64. It also provides a predetermined gain proportional to the ratio of its feedback resistor 110 to input resistance 104, and provides a low impedance source for diode 64. Another operational amplifier 112 whose feedback resistance 114 and input resistance 116 are made equal, provides an inverting unity gain so that the voltage at the side 118 of the diode 66 is the negative of the voltage at the side 111 of the diode 64. The amplifier 112 also provides a low impedance source for the diode 66.

An indicator circuit for indicating the occurrence of clipping of the noise signals comprises an oscilloscope 120 which displays positive and negative pulses. These pulses indicate the time of occurrence and magnitude of the portion of the input signals at 50 which have been clipped or removed from the output. The display circuit comprises capacitors 122 and 124, resistors 126, 128, 130, and 132, and operational amplifier 134. This circuit applies a voltage to the primary winding of transformer 136 which is proportional to the voltage drop across the resistor 62. The secondary winding 140 of the transformer drives the vertical input to the oscilloscope 120 to provide a visual indication of the voltage drop across the resistor 62. This voltage drop occurs when, and only when, one of the diodes 64 or 66 is conducting.

A noise signal input at 50 is amplified by amplifier 56 by a factor such as 10, and applied through capacitor 60 to resistor 62, to provide a larger current for processing, and to isolate the input 50. The signal appearing at junction 72 is applied to amplifier 70 which may be adjusted for a gain such as one-tenth, the amplifier 70 providing circuit isolation from the output 74 and a low impedence output source. The total circuit gain between the input 50 and the output 74, when neither diode 64 or 66 is conducting, is unity.

The clipping process performed by the circuit of FIG. 2 occurs by means of the application of the output of amplifier 56 to the operational rectifier circuit portion associated with amplifier 78. The operational rectifier portion produces a linearly amplified half-wave voltage at junction 96. This signal is averaged by the resistor-capacitor combination 100 and 98, so that the voltage at junction 106 is a negative value proportional to the average value of the negative excursions of the noise input at 50. The voltage at junction 106 is amplified by amplifier 108 whose output at 111 back-biases diode 64. The output of the amplifier 108 is also applied to amplifier 112 which provides inverting unity gain to back-bias diode 66.

The circuit may be calibrated by applying gaussian random noise at the input 50 and adjusting it to a level which provides a known root mean square voltage level at the output of amplifier 56. A probability density analyser is connected to the output of the circuit at 74. The gain of the amplifier 108 is adjusted by varying the resistence of resistor 110 to vary the back-bias of the diodes 64 and 66. The back-bias voltage is adjusted to a level which causes clipping of peak value signals at levels which are a predetermined proportion, or multiple, of the root mean square voltage at 56, or at 74, such as 300%. A probability density analyser connected at 74 can be used to confirm that clipping is being accomplished at the proper level. Thereafter, the ratio of the clipping voltage to the root mean square voltage at input 50 will be a constant ratio. An indication of the operation of the circuit is continuously provided by the oscilloscope 120, which shows the occurrence of clipping and the height of the clipped portions of the signals.

A circuit has been constructed in accordance with FIG. 2, using component values shown in Table I. This circuit was used to limit the maximum peak values of a random noise signal applied to an electrodynamic vibration system operating in a random noise mode. This vibration system was used to subject equipment to random vibrations to test their reliability, and the peak limiting circuit was used to limit maximum acceleration to three times the root mean square acceleration level.

TABLE I

| Components: | Component values |
|---|---|
| 54 | 10K ohms |
| 58 | 100K ohms |
| 62 | 10K ohms |
| 68 | 100K ohms |
| 76 | 100K ohms (variable) |
| 81 | 100K ohms |
| 84 | 1 megohm |
| 86 | 100K ohms |
| 88 | 47K ohms |
| 90 | 47K ohms |
| 100 | 47K ohms |
| 102 | 47K ohms |
| 104 | 10K ohms |
| 110 | 100K ohms (variable) |
| 114 | 10K ohms |
| 116 | 10K ohms |
| 126 | 100K ohms (variable) |
| 128 | 215K ohms |
| 130 | 21.5K ohms |
| 132 | 21.5K ohms |
| 52 | 15 mfd. |
| 60 | 4.7 mfd. |
| 80 | 4.7 mfd. |
| 82 | 2 mfd. |
| 98 | 15 mfd. |
| 122 | 0.1 mfd. |
| 124 | 0.1 mfd. |
| 64 | 1N4151 |
| 66 | 1N4151 |
| 92 | 1N4151 |
| 94 | 1N4151 |
| 136 | 1:15 ratio |

While a particular embodiment of the invention has been illustrated and described, it should be understood that many modifications and variations may be resorted to by those skilled in the art, and the scope of the invention is limited only by a just interpretation of the following claims.

What is claimed is:

1. An amplitude limiter comprising:
   input means for receiving input signals;
   output means for delivering output signals;
   means for coupling said input means to said output means, including resistor means for developing a voltage thereacross dependent upon the current flowing from said input means;
   averaging means coupled to said input means for generating signals related to an average of signals at said input means;
   clipping means responsive to the signals generated by said averaging means, said clipping means coupled to a side of said resistance means opposite said input means, for conducting currents of a magnitude sufficient to limit the peak voltage at said output means; and
   oscilloscope means coupled to said resistor means for displaying the voltage thereacross.

2. An amplitude limiter comprising:
   input means for receiving input signals;
   output means for delivering output signals;
   means for coupling said input means to said output means;
   averaging means coupled to said input means for generating signals related to an average of signals at said input means, said averaging means including an ampilfier having an input connected to said input means and an output, a diode having a first terminal connected to the output of said amplifier and a second terminal, a resistor connected between said second terminal of said diode and ground potential, and a resistance-capacitance charging network connected between said second terminal of said diode and ground potential; and
   clipping means for limiting the peak voltage output of said output means, said clipping means including a first amplifier means having an input connected to capacitor of said resistance-capacitance charging network and an output, a second amplifier means of inverting unity amplification having an input connected to the output of said first amplifier means, a first diode connected between said means for coupling and said output of said first amplifier means for drawing current from said means for coupling in the case of voltages thereon of a first polarity which exceed the voltage at the output of said first amplifier means, and a second diode connected between said means for coupling and the output of said second amplifier means for drawing current from said means for coupling in the case of voltages thereon of a second polarity which exceed the voltage at the output of said second amplifier means.

3. An automatic noise limiter comprising:
   input means for receiving noise signals;
   output means for delivering noise signals which are limited in positive and negative excursions;
   connecting means connecting said input means and said output means;
   resistance-capacitance charging means having a first terminal connected to said input means and a second terminal connected to a source of predetermined potential;
   resistance means connected across the capacitance of said charging means for discharging said capacitance;
   first diode means having a first terminal connected to said connecting means and a second terminal, for passing voltages of a first polarity on said connecting means;
   second diode means having a first terminal connected to said connecting means and a second terminal, for passing voltages of a second polarity on said connecting means; and
   amplifier means having an input connected to a side of said capacitance opposite said source of predetermined potential, a first output connected to said second terminal of said first diode means for providing a voltage proportional to the voltage across said capacitance, and a second output terminal having a voltage level which is of the same magnitude as the voltage on said first output but of opposite sign connected to said second terminal of said second diode means.

4. An automatic noise limiter as defined in claim 3 wherein:
   said connecting means comprises a resistance; and including
   oscilloscope means connected across said resistance of said connecting means for displaying large voltage drops thereacross.

5. An automatic noise limiter as defined in claim 3 wherein:
   said resistance-capacitance charging means comprises second amplifier means having an input connected to said input means and an output, first diode means connected between the input and output of said second amplifier means, second diode means connected in a direction opposite to said first diode means between the input and output of said second amplifier means, and a resistance and capacitance connected in series between a side of one said diodes opposite said output of said amplifier and said predetermined potential.

6. An automatic noise limiter as defined in claim 5 wherein:

said input means for receiving noise signals comprises an amplifier of predetermined amplification; and said output means comprises an amplifier having an amplification which is the inverse of the amplification of said amplifier of said input means.

References Cited

UNITED STATES PATENTS

| 2,345,026 | 3/1944 | Boykin | 328—171 |
| 2,931,901 | 4/1960 | Markusen | 328—171 |
| 3,028,554 | 4/1962 | Hilliard | 307—237 |
| 3,226,653 | 12/1965 | Miller | 328—171 |
| 3,235,791 | 2/1966 | Miller | 307—237 |

DONALD D. FORRER, Primary Examiner

H. A. DIXON, Assistant Examiner

U.S. Cl. X.R.

307—237